US012773883B2

(12) United States Patent
Evans et al.

(10) Patent No.: US 12,773,883 B2
(45) Date of Patent: Oct. 27, 2026

(54) SYSTEMS, DEVICES AND METHODS FOR DYNAMICALLY GENERATING TIRE FIRMNESS VALUES IN RESPONSE TO USER SELECTION AND/OR OTHER DATA

(71) Applicant: Cypress Semiconductor Corporation, San Jose, CA (US)

(72) Inventors: Bradley Evans, Northville, MI (US); Nicholas Stopher, White Lake, MI (US)

(73) Assignee: Infineon Technologies Americas Corp., El Segundo, CA (US)

( * ) Notice: Subject to any disclaimer, the term of this patent is extended or adjusted under 35 U.S.C. 154(b) by 354 days.

(21) Appl. No.: 18/391,392

(22) Filed: Dec. 20, 2023

(65) Prior Publication Data

US 2025/0206080 A1 Jun. 26, 2025

(51) Int. Cl.
*B60C 23/04* (2006.01)

(52) U.S. Cl.
CPC ...... *B60C 23/0462* (2013.01); *B60C 23/0442* (2013.01); *B60C 23/0452* (2013.01); *B60C 23/0471* (2013.01); *B60C 23/0474* (2013.01)

(58) Field of Classification Search
CPC ............ B60C 23/0462; B60C 23/0442; B60C 23/0452; B60C 23/0471; B60C 23/0474; B60C 23/009; B60C 23/002; B60C 23/0479
USPC .................................................. 340/442–447
See application file for complete search history.

(56) References Cited

U.S. PATENT DOCUMENTS

| | | | | |
|---|---|---|---|---|
| 6,445,287 | B1 * | 9/2002 | Schofield | B60C 23/00 340/447 |
| 7,218,209 | B2 * | 5/2007 | Utter | B60C 23/0408 340/447 |
| 11,571,936 | B1 * | 2/2023 | Del Olmo | B60C 23/0496 |
| 12,030,356 | B2 * | 7/2024 | Coombs | G01G 19/10 |
| 12,522,028 | B2 * | 1/2026 | Chatziioannou | B60C 23/002 |
| 2003/0164759 | A1 * | 9/2003 | Nantz | B60C 23/0476 340/442 |
| 2021/0061027 | A1 * | 3/2021 | Da Deppo | B60C 23/041 |
| 2022/0032695 | A1 * | 2/2022 | Coburn | B60C 23/0403 |
| 2022/0371385 | A1 * | 11/2022 | McNaught | B60C 29/064 |
| 2023/0226860 | A1 * | 7/2023 | Lesesky | B60C 23/0479 340/442 |
| 2025/0001816 | A1 * | 1/2025 | Nicol | B60C 23/00345 |

* cited by examiner

*Primary Examiner* — Eric Blount

(57) ABSTRACT

A method can include wirelessly receiving and storing tire information in memory circuits. By operation of processing circuits, an initial tire firmness value can be determined for one or more tires using the stored tire information. By operation of communication circuits, an initial tire firmness value can be transmitted. Mode information can be received and stored in memory circuits. In response to mode information, processing circuits can determine a revised tire firmness value for one or more tires using at least the mode information. By operation of communication circuits, revised tire firmness values can be wirelessly transmitted.

16 Claims, 11 Drawing Sheets

SYSTEMS, DEVICES AND METHODS FOR DYNAMICALLY GENERATING TIRE FIRMNESS VALUES IN RESPONSE TO USER SELECTION AND/OR OTHER DATA

TECHNICAL FIELD

The present disclosure relates generally to vehicle systems, and more particularly to systems related to tire firmness values.

BACKGROUND

Vehicles can include a tire pressure monitoring system (TPMS) to monitor the pressure of tires. A conventional TPMS can include TPMS sensors mounted within each tire. TPMS sensors periodically generate tire pressure values and transmit them to a central TPMS receiver node. A conventional TPMS sensor includes an RF transmitter and LF receiver. The RF transmitter transmits tire pressure readings to a central TPMS node at a relatively high frequency (300-400 MHZ). The LF receiver can receive input signals at a relatively low frequency (125 kHz). Tire pressure values received at a central node can be displayed to a driver and/or compared to predetermined limits to indicate when a low pressure state exists.

Tire manufacturers typically provide a recommended tire pressure value or tire pressure range. Vehicle owners can seek to maintain tires at the recommended pressure to ensure proper tire wear and/or tire longevity.

SUMMARY OF DISCLOSURE

Embodiments can include systems, devices and methods that can include wirelessly receiving and storing tire information in memory circuits. Processing circuits can determine an initial tire firmness value for one or more tires using the stored tire information. Communication circuits can wirelessly transmit the initial tire firmness value. Memory circuits can receive and store mode information. In response to the mode information, processing circuits can determine a revised firmness value for one or more tires using the mode information. Communication circuits can wirelessly transmit the revised tire firmness value.

DETAILED DESCRIPTION

According to embodiments, a system can dynamically generate tire firmness values in response to a user selected driving mode or other mode information. Based on tire information, which can be received wirelessly by a vehicle system, a vehicle system can determine a tire firmness corresponding to a user selected driving mode. When a user selected driving mode is changed, tire firmness values can be updated. Tire firmness can indicate a responsiveness of a tire to a surface it contacts. For inflatable tires, tire firmness can include tire pressure, and may or may not vary according to a type of filling gas (e.g., air or nitrogen). For non-pneumatic tires, tire firmness can include any adjustable mechanical flexibility or other response available to such a tire.

In some embodiments, in response to environmental data (e.g., temperature, road conditions), tire firmness values can be updated.

In some embodiments, as a vehicle state or configuration changes (e.g., load, tire position, temperature, road conditions), tire firmness values can be updated.

In some embodiments, tire firmness values can be received by tire firmness control devices, which can dynamically adjust tire firmness as tire firmness values are dynamically updated.

In some embodiments, tire firmness value changes can be recorded over time to create a tire history. A tire history can be wirelessly uploaded to a remote computing system for analysis. Such analysis can generate tire firmness values, including but not limited to optimal tire firmness for given modes (e.g., driving modes, vehicle configurations, vehicle sensors, geographic locations, weather and combinations thereof).

Figure 1:
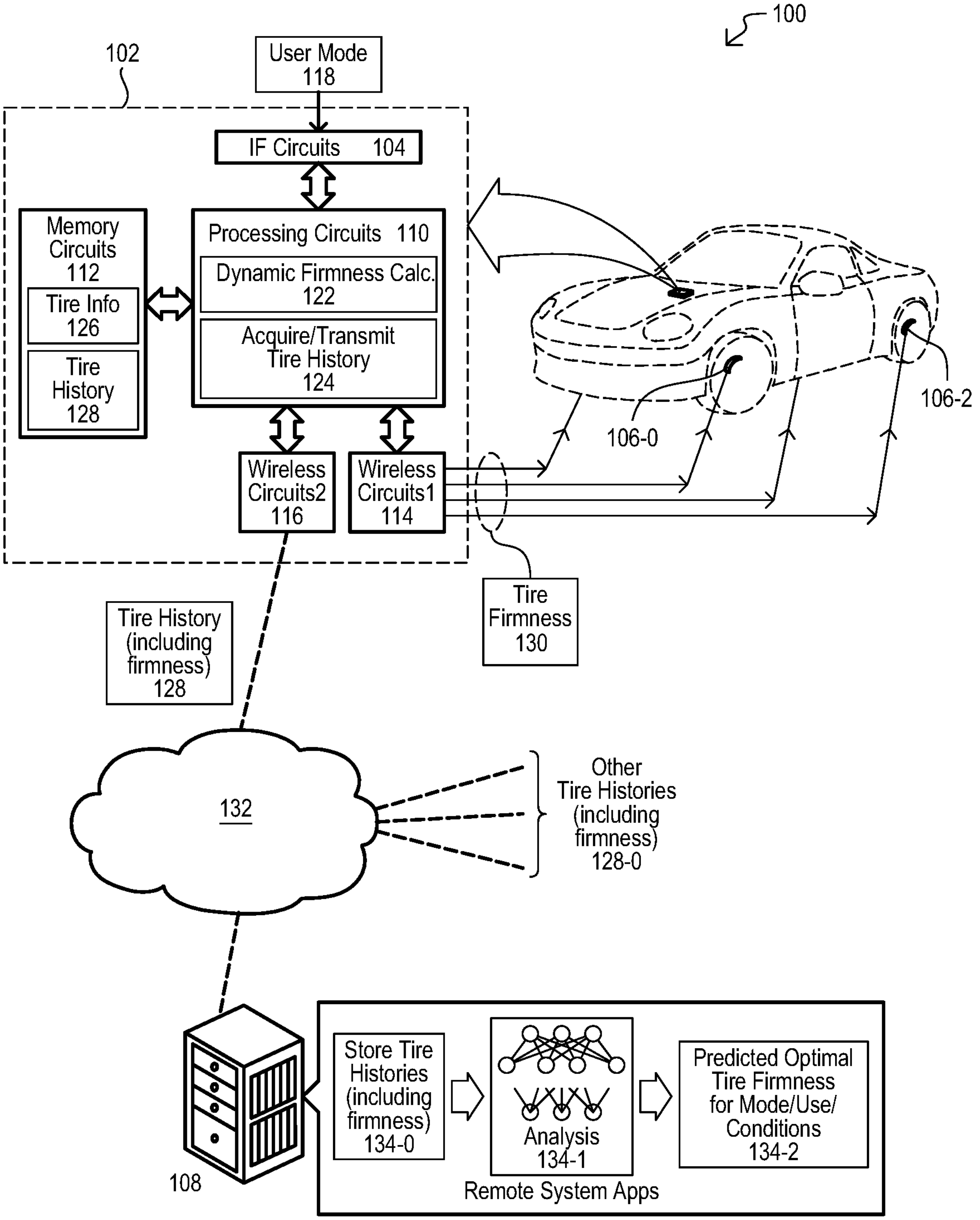
FIG. 1 is a diagram showing a system for dynamically updating tire firmness values according to an embodiment.

FIG. 1 is a diagram of a system 100 according to an embodiment. A system 100 can include one or more vehicle systems 102, a remote computing system 108, and optionally, tire firmness control devices (two of four shown as 106-0, 106-2). A vehicle system 102 can include interface 104, processing circuits 110, memory circuits 112, first wireless circuits 114, and second wireless circuits 116. Interface 104 can enable a user mode data 118 to be received from a source separate from a vehicle system 102 and/or external to the corresponding vehicle. User mode data 118 can indicate a desired driving mode for a vehicle, which can correspond to a particular tire firmness value.

Processing circuits 110 can take any suitable form, including one or more processors, standard logic, custom logic, or programmable logic. Processing circuits 110 can execute dynamic tire firmness calculations 122. Tire firmness calculations 122 can include calculating tire firmness values that can be updated over time as modes and/or conditions change. In some embodiments, tire firmness calculations 122 can use tire information 126 stored in memory circuits 112. In some embodiments, processing circuits 110 can also execute and acquire and transmit tire history operation 124. Such an operation can detect tire states over time, including tire firmness, and transmit such data to a remote computing system 104.

Memory circuits 112 can store tire information 126 and tire history data 128. Tire information 126 can include information for a tire, including firmness values corresponding to different modes. In some embodiments, tire information 126 can include tire manufacturer data. Tire history data 128 can include data capturing a tire state at different points in time, including tire firmness changes. In some embodiments, memory circuits 112 can include nonvolatile memory that can store tire information 126 and tire history data 128 in the absence of power.

First wireless circuits 114 can be controlled by processing circuits 110 to transmit tire firmness values 130 from a vehicle system 102. In some embodiments, a vehicle can include tire firmness control devices (two shown as 106-0 to 106-2). Tire firmness control devices (106-0, 106-2) can receive tire firmness values 130, and adjust a firmness, if necessary, in response. In a vehicle system that does not include tire firmness control devices, tire firmness values 130 can be provided to an interface 108 to notify a user and/or provided to a user device (not shown).

Second wireless circuits 116 can be controlled by processing circuits 110 to transmit tire history data 128 from a vehicle system 102. In some embodiments, second wireless circuits 116 can be compatible with a different standard than first wireless circuits 114. Tire history data 128 can be transmitted to a remote computing system 108 through a network 132 that can include a wireless network. A network 132 can include one or more wireless networks, including the Internet.

A remote computing system 108 can receive tire history data 128 from vehicle system 102, as well as tire history data 128-0 from other vehicles or sources. A remote computing system 108 can store tire history data 134-0 and analyze tire history data (and optionally other data) 134-1. Such analysis can include any suitable analysis, and in the embodiment shown, can include predicting optimal tire firmness for a given mode, use or conditions 134-2. In some embodiments, such analysis 134-1 can use a machine learning system.

In this way, one or more vehicle systems can dynamically generate tire firmness values in response to user mode and/or other data. In addition, tire histories, including tire firmness values over time, can be uploaded for processing by a remote computing system.

FIGS. 2A to 2E are diagrams of tire firmness generating systems and operations according to various embodiments.

Figure 2A:
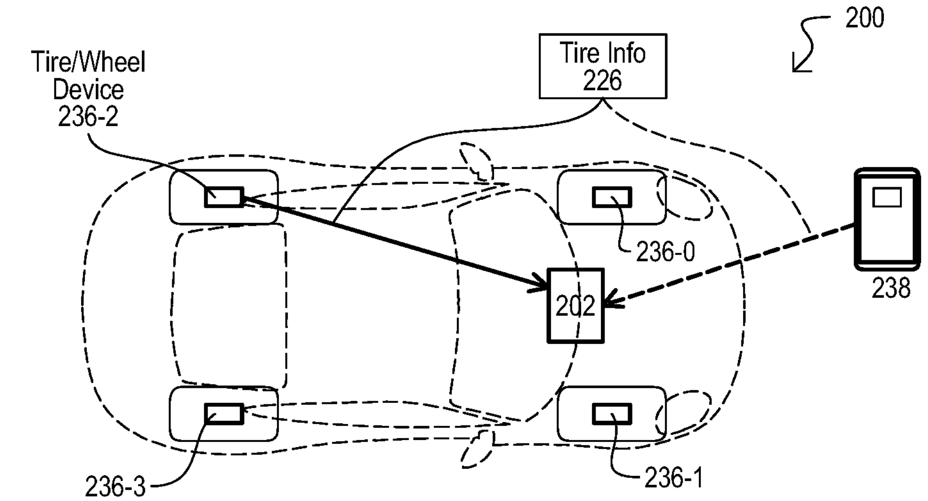
FIGS. 2A to 2E are diagrams showing systems and operations for dynamically updating tire firmness according to embodiments.

FIG. 2A shows a system 200 that can include a vehicle system 202, tire or wheel devices 236-0 to 236-3, and optionally, an external user device 238. A vehicle system 202 can receive and store tire information 226 for each tire. Tire information 226 can include information that indicates tire firmness values for various vehicle operating modes, as well as any other suitable information, including but not limited to, information identifying the tire (e.g., manufacturer's information). In some embodiments, tire/wheel devices (236-0 to -3) can store tire information 226, and wirelessly transmit such data to a vehicle system 202. In addition or alternatively, a user device 238 can wirelessly transmit tire information 226 to a vehicle system 202. While FIG. 2A shows the transmission of tire information 226 from one tire/wheel device 236-2, tire information can be transmitted from the other tire/wheel devices 236-0/1/3.

Tire/wheel devices (236-0 to -3) can take any suitable form, including a device included with a tire, or a device mounted on a wheel. Tire/wheel devices (236-0 to -3) can include, but are not limited to, intelligent valve stem assemblies and/or tire firmness control devices (e.g., on-vehicle compressors).

In this way, tire information that includes tire firmness values for various vehicle operating modes can be received and stored by a vehicle system.

Figure 2B:
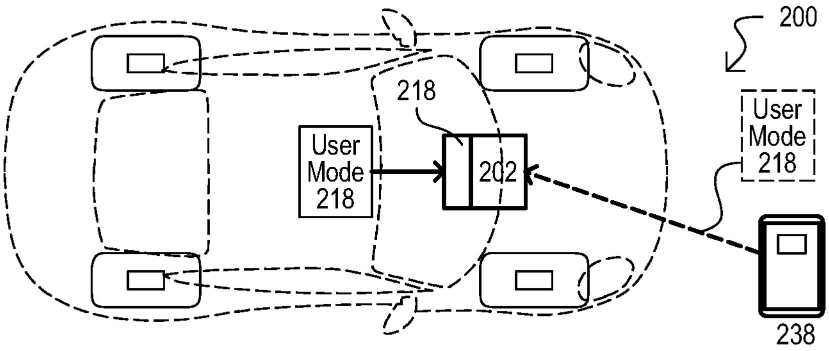

FIG. 2B shows a system 200 that includes a vehicle system 202, interface 218, and optionally, a user device 238. A user can provide user mode data 218 to a vehicle system 202 via an interface 218. An interface 218 can be any suitable vehicle interface, including but not limited to those incorporated into an in-vehicle infotainment system (IVI). A vehicle system 202 can store user mode data 218, and from such data, generate tire firmness values for tires of a vehicle. In addition or alternatively, a user device 238 can wirelessly transmit user mode data 218 to a vehicle system.

In this way, user mode data can be received at a vehicle system, and used to generate tire firmness values for a vehicle.

Figure 2C:
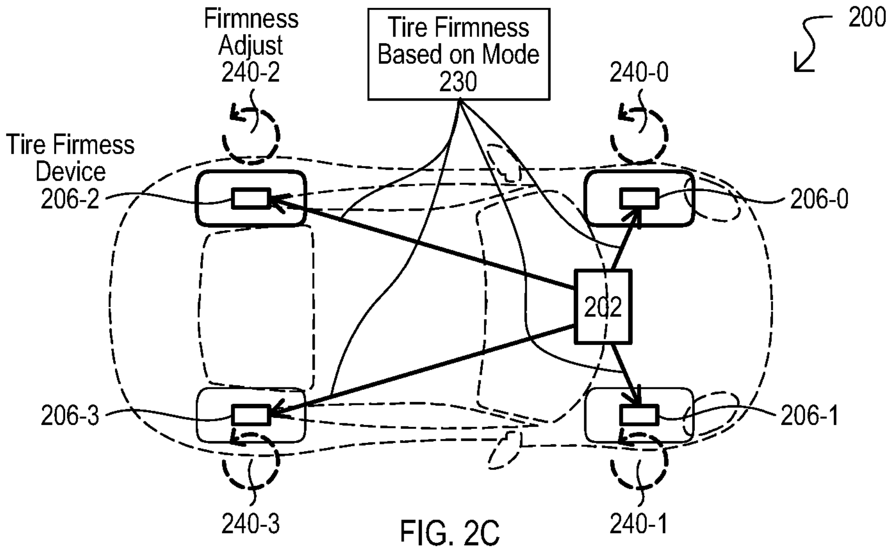

FIG. 2C shows a system 200 that includes a vehicle system 202 and tire firmness control devices 206-0 to 206-3. In response to user mode data, and optionally other mode data, a vehicle system 202 can generate target tire firmness values (TF) 230, and wirelessly transmit such values to tire firmness control devices (206-0 to -3). In response to receiving target TFs 230, tire firmness control devices (206-0 to -3) can adjust a firmness of their corresponding tire 240-0 to 240-3. It is understood that a vehicle system 202 can target TFs 230 in response to changes in user mode data and/or other data. Thus, target TFs 230 can be considered dynamic values that can be updated over time.

Tire firmness control devices (206-0 to -3) can take any suitable form, including devices suitable for pneumatic and non-pneumatic tires. In some embodiments, tires can be pneumatic tires, and tire firmness control devices (206-0 to -3) can inflate, and optionally, deflate tires to a received target TF. In some embodiments, tires can be non-pneumatic tires, and tire firmness control devices (206-0 to -3) can change tire firmness according to a received target TF.

In this way, a vehicle system can transmit target tire firmness values that can vary over time to tire firmness control devices, which can adjust tire firmness accordingly.

Figure 2D:
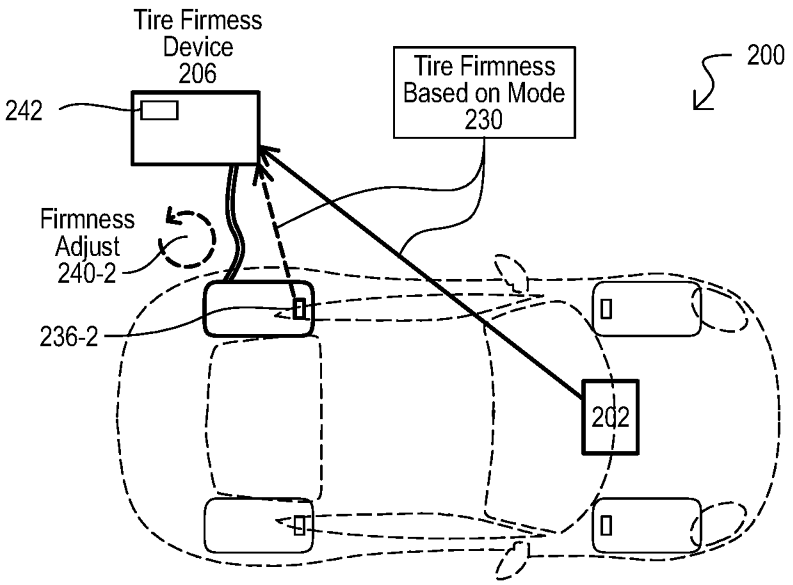

FIG. 2D shows a system 200 that includes a vehicle system 202, tire/wheel devices (one shown as 236-2) and an external tire firmness control device 206. In response to user mode data, and optionally other mode data, a vehicle system 202 can generate a target TF 230. A vehicle system 202 can wirelessly transmit a target TF 230 to external tire firmness control device 206. In other embodiments, a TF 230 can be transmitted from a tire/wheel device 236-2, which can take the form of any those described herein or equivalents.

An external tire firmness control device 206 can include wireless circuits 242 for receiving a target TF. In response to a received a target TF 230, external tire firmness control devices 206 can adjust a firmness of the corresponding tire 240-2. As in the case of the system of FIG. 2C, a target TF 230 can be a dynamic value that can be updated/changed over time. An external tire firmness device 206 can take any suitable form based on the type of tire used on the vehicle. In some embodiments, an external tire firmness device 206 can be a "smart" compressor device.

In this way, a vehicle system can transmit target tire firmness values to an external tire firmness device, that can adjust a tire firmness accordingly.

Figure 2E:
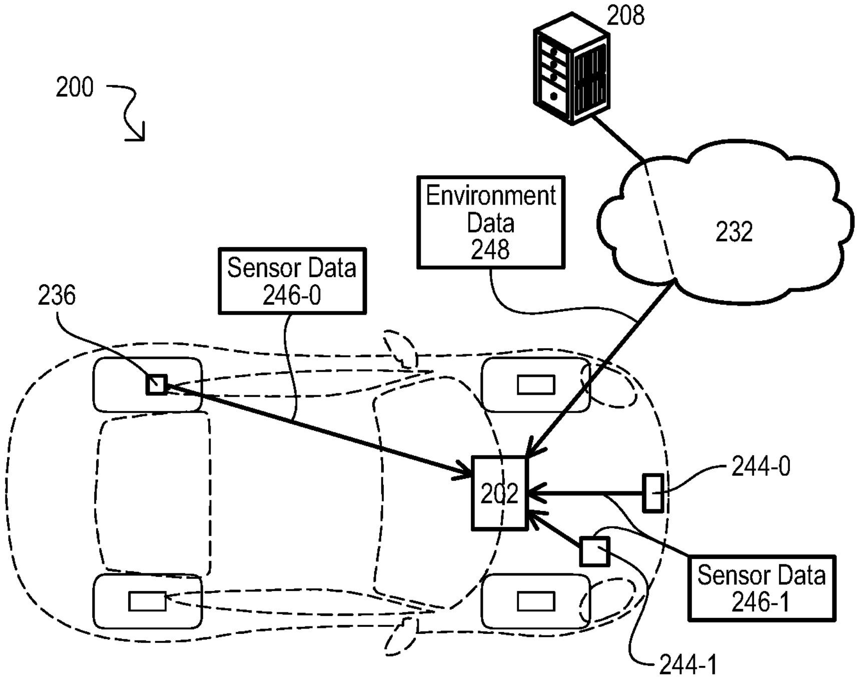

FIG. 2E shows a system 200 that includes a vehicle system 202, tire/wheel devices (one shown as 236), vehicle sensors 244-0/1, and optionally, a remote computing system 208. Any of tire wheel devices 236 and vehicle sensors 244-0/1 can provide data on a state of vehicle to vehicle system 202. In response to such data, as well as tire information data (described in previous embodiments), a vehicle system 202 can generate target TFs. Such target TFs can be updated as data from devices/sensors (236, 244-0/1) changes. Tire firmness can then be adjusted in response to such target TFs as describe for the various embodiments herein, and equivalents (e.g., as shown in FIG. 2C).

In addition or alternatively, a vehicle system 202 can receive environment data 248 from a remote computing system 208 via a wireless network 232. Environment data 248 can take any suitable form identifying locations where a vehicle is traveling. Environment data 248 can include, but is not limited to, road conditions, traffic conditions, weather, road hazards/events, geographic locations (e.g., parking areas). In response to such environment data 248, vehicle system 202 can update target TFs.

In this way, a vehicle system can dynamically update tire firmness values in response to vehicle sensors and/or vehicle environment data. Vehicle environment data can be generated locally and/or received from a remote computing system.

Figure 3:
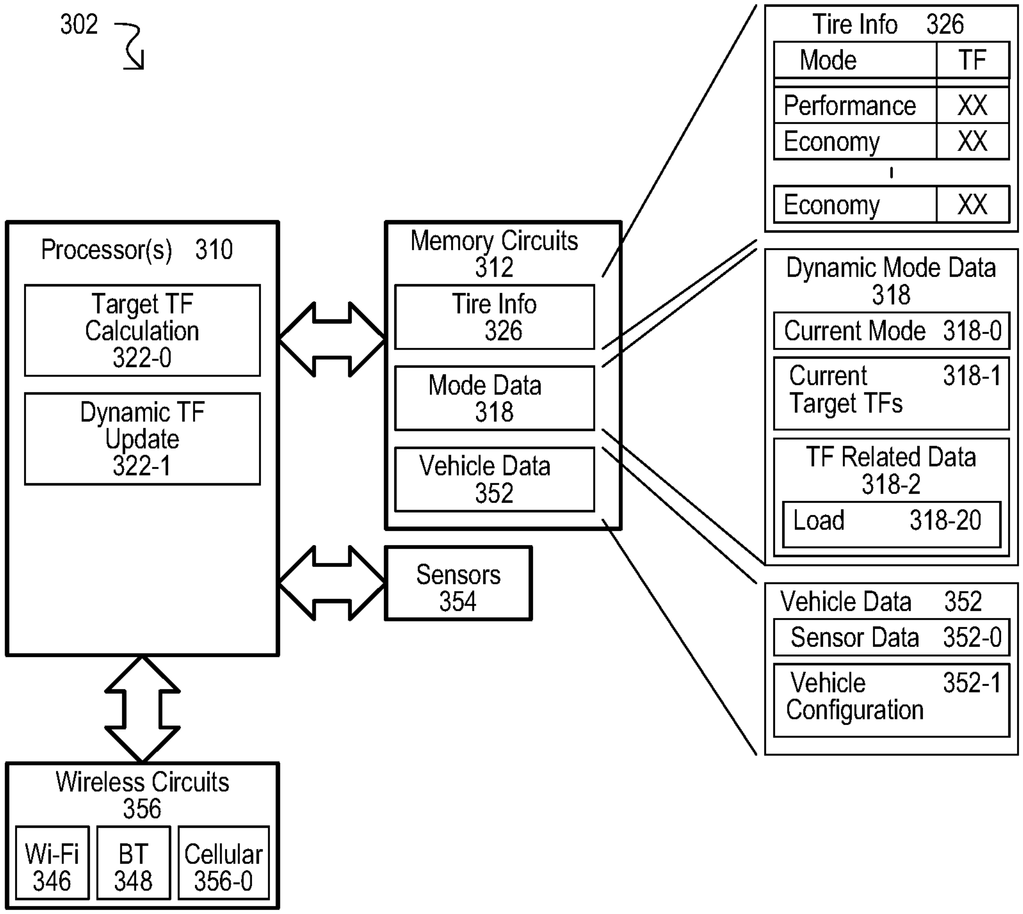
FIG. 3 is a block schematic diagram of a vehicle system according to an embodiment.

FIG. 3 is a block schematic diagram of vehicle system 302 according to another embodiment. A system 302 can include a processor circuits 310, memory circuits 312, wireless circuits 356, and sensor circuits 354. Processor circuits 310 can include one or more processors for executing operations related to the generation and transmission of target TFs. Such operations can include, but are not limited to, target TF calculations 322-0 and dynamic TF update operations 322-1. Target TF calculations 322-0 can include calculating target TFs for all tires of a vehicle system based on tire information 326 and other mode information, including but not limited to mode data 318 and/or vehicle data 352. It is understood that target TFs can include single values or a range of values. Dynamic TF update operations 322-1 can include transmitting new target TF values as they are calculated. In some embodiments, dynamic TF update operations 322-1 can include some hysteresis, to lower frequency of tire firmness changes at, or around, a target TF.

Memory circuits 312 can store tire information 326, mode data 318 and vehicle data 352. As noted herein, from such data, processor circuits 310 can calculate target TF values. Tire information 326 can include information for each tire of a vehicle system, including target TFs for various selectable user modes. Mode data 318 can include data that can change over time. Mode data 318 can include, but is not limited to, a current mode 318-0, current target TFs 318-1, and TF related data 318-2. In some embodiments, a current mode 318-0 can be driving mode selected by a user. TF related data 318-2 can include other data that can be included in the calculation of a target TF, and in the embodiment shown, can include a load 318-20 experienced by a vehicle. Vehicle data 352 can indicate a state of a vehicle and can include, but is not limited to, sensor data 352-0 as well as vehicle configuration data 352-1. Sensor data 352-0 can include any suitable sensor readings that can result in changes in target TF, including but not limited to, current tire firmness (e.g., tire pressure) as well as temperature. Vehicle configuration data 352-1 can indicate how a vehicle is being used that can result in change in target TF, such data can include traction modes (e.g., four wheel drive, all wheel drive), whether vehicle is towing and/or what a vehicle is towing. Sensor data 352-0 can be provided by sensors circuits 354.

Wireless circuits 356 can include circuits for transmitting target TFs and/or receiving data for calculating target TFs. In the embodiment shown, wireless circuits 356 can include Wi-Fi circuits 346, BT circuits 348 and cellular circuits 356-0. In some embodiments, Wi-Fi circuits 346 and/or cellular circuits 356-0 can receive mode data from one or more remote systems, for calculating tire TFs. In some embodiments, BT circuits 348 can receive tire information for calculating target TFs and can transmit target TFs.

In this way, a vehicle system can receive tire information, mode data and vehicle data to calculate and dynamically update target tire firmness values.

Figure 4:
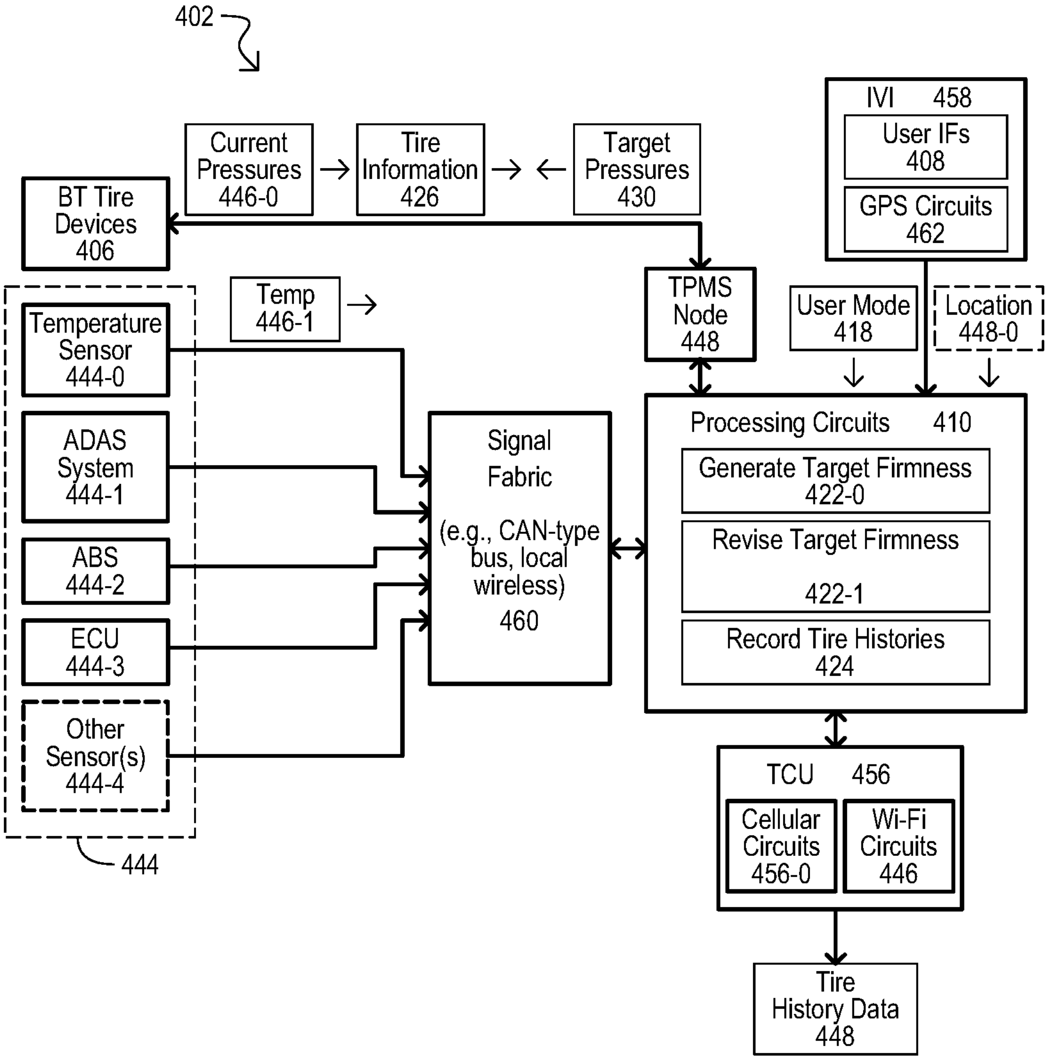
FIG. 4 is a block schematic diagram of a vehicle system according to another embodiment.

FIG. 4 is a block schematic diagram of a vehicle system 402 according to a further embodiment. A vehicle system 402 can include BT tire devices 406, other sensors 444, processing circuits 410, a wireless node 448, communication fabric 460, IVI 458, and TCU 456. BT tire devices 406 can include one or more devices that can sense tire pressure in tires of a vehicle, and can control tire pressure (e.g., inflate, and optionally, deflate tires). BT tire devices 406 can wirelessly transmit tire information 426 and tire pressure values 446-0. In response to received target pressures 430, BT tire devices 406 can adjust tire pressures to a target tire pressure. In the embodiment shown, BT tire devices 406 can communicate with wireless node 448, which can be a tire pressure monitoring system.

Other sensors 444 can include a temperature sensor 444-0, advanced driver assistance system (ADAS) 444-1, an anti-lock braking system (ABS) 444-2, one or more electronic control units 444-3, and other sensors 444-4. Temperature sensor 444-0 can provide temperature values 446-1 which can be used in target TF calculations. ADAS 444-1 can provide data from various vehicle sensors, including but not limited to lidar, radar, cameras and/or ultrasound sensors. ABS 444-2 can provide braking data and/or wheel rotation data. An ECU 444-3 can provide time data and/or speed data. Other sensors 444-4 can include any other vehicle sensors.

Data from sensors 444 can be provided to processing circuits 410 via a vehicle signal fabric 460. A signal fabric 460 can include any suitable data transmission systems of a vehicle, including but not limited to wireless systems (e.g., BT, Wi-Fi, Zigbee) and/or wired systems (e.g., CAN-type bus, media oriented systems transport (MOST), Flexray or Automotive Ethernet).

An IVI 456 can include one or more user IFs 408 as well as GPS circuits 462. User IFs 408 can provide user mode data 418 to processing circuits 410. In some embodiments, GPS circuits 462 can provide location data 448-0 to processing circuits 410.

Processing circuits 410 can receive tire information 426, tire pressure data 446-0, and data from other sensors 444, and in response, generate target firmness values 422-0, as described herein or equivalents. If generated target firmness values differ from current tire pressure data 446-0, processing circuits 410 can revise target firmness values 422-1, and transmit new target pressures 430 to BT tire devices 406. In the embodiments shown, processing circuits 410 can also record tire histories 424. Such operations can include recording tire pressure values and/or changes in tire pressure values, and the time/date at which such data are taken. In some embodiments, such operations can record other tire events (e.g., bumps, loads).

A TCU 456 can include cellular circuits 456-0 and/or Wi-Fi circuits 446. In some embodiments, tire history data 448 can be wireless transmitted from a vehicle system by Wi-Fi circuits 446, cellular circuits 456-0, or both.

In this way a vehicle system can utilize tire information, as well as other vehicle sensor data, to calculate and revise target tire firmness values. In addition, tire histories, including tire firmness data, can be accumulated, and periodically transmitted from a vehicle system.

While systems according to embodiments can take any suitable form, some embodiments can be advantageously compact single integrated circuit devices capable of providing wireless communications according to multiple wireless standards. Tire firmness values can be transmitted according to one wireless standard (e.g., a relatively shorter range standard), while tire history data can be uploaded to networks according to another standard (e.g., a longer range standard).

Figure 5A:
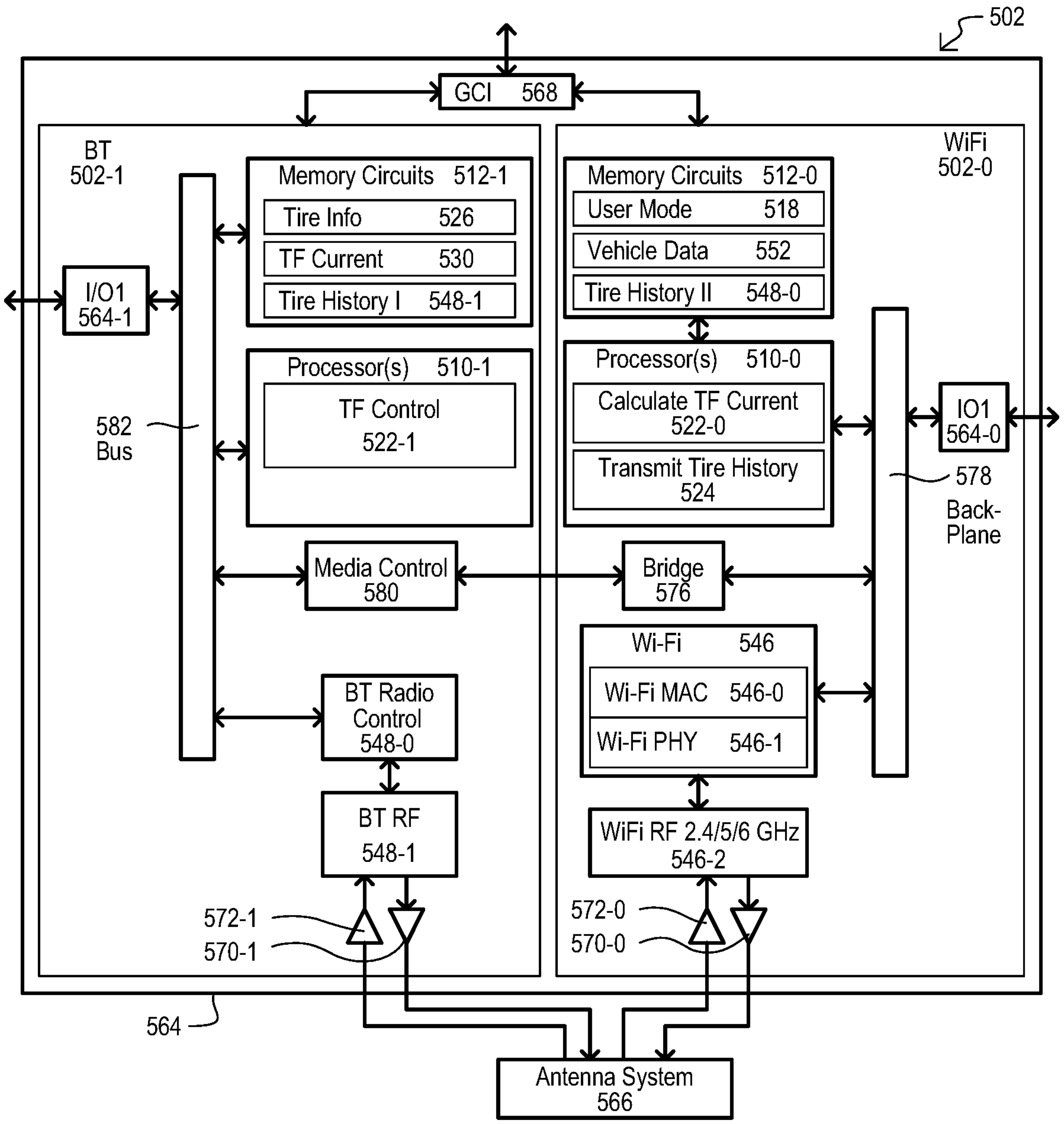
FIGS. 5A and 5B are diagrams of a vehicle system according to a further embodiment.

FIG. 5A is a block diagram of a tire firmness value generation system 502 according to another embodiment. In some embodiments, a system 502 can include a single integrated circuit (IC) device 564 that can connect to an antenna system 566. IC device 564 can include a Wi-Fi section 502-0, a BT section 502-1, a coexistence interface (GCI) 568, power amplifiers (PAS) 566-0, 560-1 and low noise amplifiers (LNAs) 562-0, 562-1.

A Wi-Fi section 504-0 can include processor circuits 510-0, memory circuits 512-0, first input/output (IO) circuits 564-0, bridge control circuit 576, Wi-Fi control circuits 546 and Wi-Fi radio circuits 546-2, all connected to one another over a backplane 578. Processor circuits 510-0 can include one or more processors that execute instructions for dynamic tire firmness update operations, including but not limited to, calculating current TFs 522-0 and transmitting tire history data 524. Calculating a current TFs 522-0 can include generating target TFs according to any of the embodiments described herein, including using tire information, user mode information, vehicle data and/or environment data. Transmitting tire history 524 can include transmitting accumulated tire history, as described herein and equivalents.

Memory circuits 512-0 can store data accessible by a system 502, including by processor circuits 510-0. Such data can include, but is not limited to, user mode data 518, vehicle data 552 and tire history data 548-0. User mode and vehicle data 512/518 can include any of those described herein or equivalents. Tire history data 548-0 can include one part of tire history data transmitted from system 502. In some embodiments, such tire history data can include date/times that tire firmness was updated. In some embodiments, tire history data 548-0 can include tire history 548-1 generated and stored in BT section 502-1.

First IO circuits 564-0 can enable communication with the system 502 according to any suitable interface, including a serial interface or parallel interface. In some embodiments, first IO circuits 564-0 can be compatible with one or more serial standards, including but not limited to: an SPI standard, I2C standard, USB standard, CAN bus, PCI Express and/or a proprietary standard.

Wi-Fi control circuits 546 can include circuits for performing wireless communications, including those operating in the 2.4, 5 or 6 GHz band. In some embodiments, this can include Wi-Fi compatible media access control layer (MAC) circuits 546-0 and Wi-Fi compatible physical interface layer (PHY) circuits 546-1. Wi-Fi RF circuits 546-2 can include multi-band radio circuits that transmit and receive data on one or more Wi-Fi bands. In the embodiment shown, Wi-Fi RF circuits 546-2 can drive one or more PAs 570-0 and receive input signals from on one or more LNAs 572-0.

In some embodiments, when in proximity to an appropriate network, Wi-Fi section 502-0 can connect to such a network, and transmit tire history data (e.g., operation 524) for reception by a remote computing system.

BT section 502-1 can provide wireless communications according to one or more BT standards. BT section 504-1 can include processor circuits 510-1, memory circuits 512-1, media control circuits 580, second IO circuits 564-1, and BT radio control circuits 548-0 all connected to one another by a bus 582.

In the embodiment shown, processor circuits 510-1 can perform various operations related to tire firmness control, including controlling the transmission of target TFs 522-1. Such operations can take the form of any of those described herein, or equivalents, including but not limited to transmitting target TF to tire firmness control devices, to a user IF and/or to a user device. Memory circuits 512-1 can store tire information 526, current TFs 530 and tire history data 548-1. Tire information 526 can take the form of any of those described herein or equivalents. In some embodiments, current TFs 530 can be those calculated by processing circuits 510-0 within Wi-Fi section 502-0. Tire history data 548-1 can include tire firmness values received via BT transmissions, such as those reported by tire devices (e.g., pressure monitoring devices). In some embodiments, tire history data 548-1 can be included in tire history 548-2 stored in, and transmitted from, Wi-Fi section 502-0.

BT RF circuits 548-1 can be controlled by BT radio control circuits 548-0 and can include radio circuits to enable transmission of messages according to one or more BT standards. In the embodiment shown, BT RF circuits 548-1 can drive one or more PAs 570-1 and receive input signals from one or more LNAs 572-1.

Media control circuits 580 can communicate with Wi-Fi section 502-0 using bridge control circuits 576 to control access to a transmission media shared by BT section 502-1 and Wi-Fi section 502-0 (e.g., 2.4 GHz band). In some embodiments, such a communication path can be used to transfer data between processor circuits 510-0 and 510-1, including tire history data 548-1 from BT section 502-1 to Wi-Fi section 502-0, and target TF values from Wi-Fi section 502-0 to BT section 502-1. Second IO circuits 564-1 can enable communication with system 502 according to any of the embodiments described herein or equivalents.

Wi-Fi section 502-0 and BT section 502-1 can be in communication with a coexistence interface 568. A coexistence interface 568 can enable Wi-Fi section 502-0 and BT section 502-1 to interface with other wireless systems, such as cellular network systems, including but not limited to 3G, 5G, LTE and 5G networks. By way of such an interface, a system 502 can transmit tire histories.

Figure 5B:
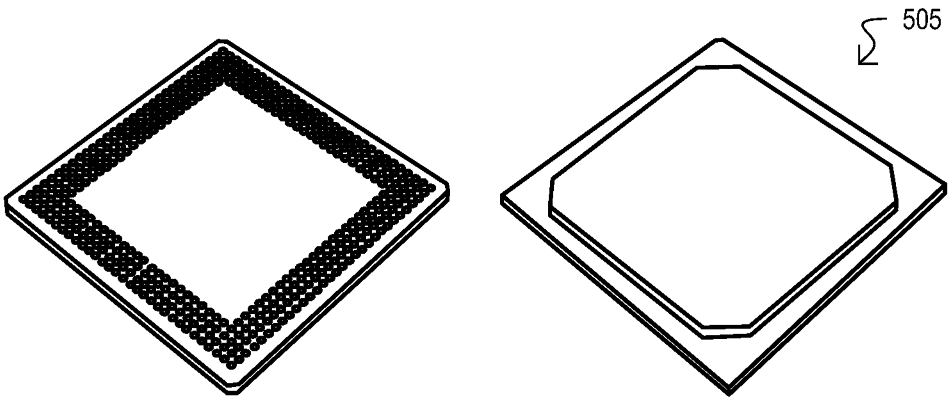

FIG. 5B includes two views of a packaged single chip system 505 which can dynamically update tire firmness values as described herein, or equivalents. In some embodiments, a system 505 can include those circuits shown in FIG. 5A.

In this way, a system can include a single integrated circuit device with different wireless circuits for transmitting dynamically updated tire profile data and tire history data.

Figure 6A:
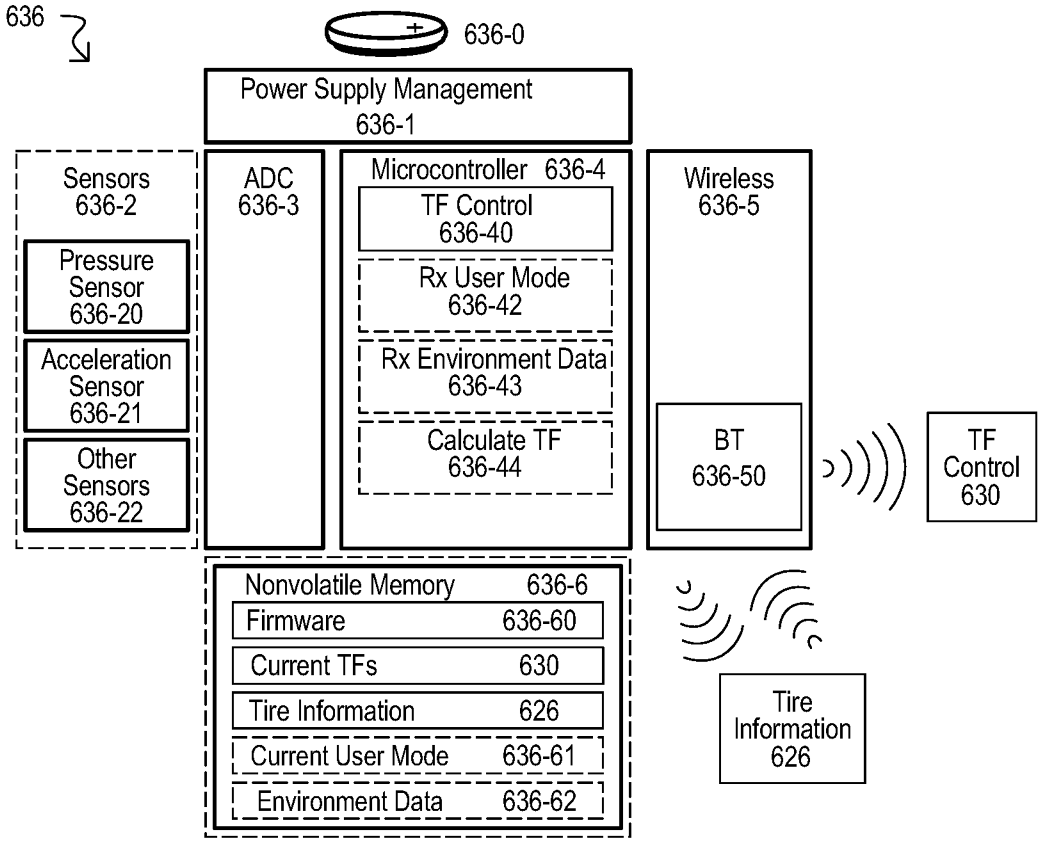
FIGS. 6A and 6B are diagrams showing tire devices according to embodiments.

FIG. 6A is a block diagram of a tire device 636 according to an embodiment. A tire device 636 can include a power supply management circuit 636-1, an analog-to-digital converter circuit (ADC) 636-3, a microcontroller 636-4, wireless circuits 636-5, and nonvolatile memory 636-6. A tire device 636 can be connected to, or include sensors 636-2 and a battery 636-0. Sensors 636-2 can include a pressure sensor 636-20 and any other suitable sensors for detecting features of a tire, including an accelerometer 636-21, and other sensors 636-22 (such a temperature sensor, as but one of many possible examples). A battery 636-0 can enable tire sensor device to operate without a wired connection to vehicle power.

ADC 636-3 can convert analog signals received from tire sensors 636-2 into digital values, including converting tire pressure readings into digital values for comparison to target TF values.

A microcontroller 636-4 can be programmed to execute various functions, including but not limited to, controlling TFs 602-40. Such a function can include comparing current target pressures to a current TF. If current pressures are not within range of target TFs, controlling TFs 602-40 can transmit target TFs to tire firmness control devices. Optionally, a microcontroller 636-4 can receive user mode data 636-42 and/or environmental data 636-43. Such data can take the form of any of those described herein. From such data, a microcontroller can calculate target TFs 630. That is, in such an embodiment, target TFs can be calculated in a tire device 636 as opposed to some other vehicle system.

Wireless circuits 636-5 can operate according to one or more wireless standards to transmit data from and receive data at the tire device 636. In the embodiment shown, wireless circuits 636-5 can include BT circuits 635-50. BT circuits 636-50 can transmit target TF values 630, as well as receive and/or transmit tire information 626. Tire information can be received in any suitable manner and from any suitable source, including but not limited to, from another wireless device associated with a tire, another vehicle system, or a system external to a vehicle (e.g., service provider system). In some embodiments, BT circuits 636-50 can transmit tire history data to other vehicle systems.

Nonvolatile memory circuits 636-6 can store firmware 636-60, current TFs 630 and tire information 626. Firmware 636-60 can include instructions executable by microcontroller 636-4 to provide the various operations described. Current TFs 630 can be current target TFs received from other systems for transmission to tire firmness control devices or user notification devices. Optionally, current TFs can be generated by a tire device 636 itself. Tire information 626 can take the form of any of those described herein or equivalents. Optionally, nonvolatile memory circuits 636-6 can store a current user mode 636-61 and/or environment data 636-62 for use in calculating target TFs.

Figure 6B:
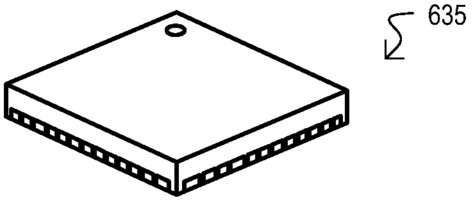

FIG. 6B is a diagram of a tire device 635 according to an embodiment. A tire sensor device 635 can include circuits like those shown as 636 in FIG. 6A, and can be in the form of a single integrated circuit (IC) device. Alternate embodiments can include a different type of packaging and/or an unpackaged die attached to systems substrate in any suitable fashion.

In this way, a tire device can include circuits for controlling tire firmness in response to dynamically changing target TF values.

Figure 7:
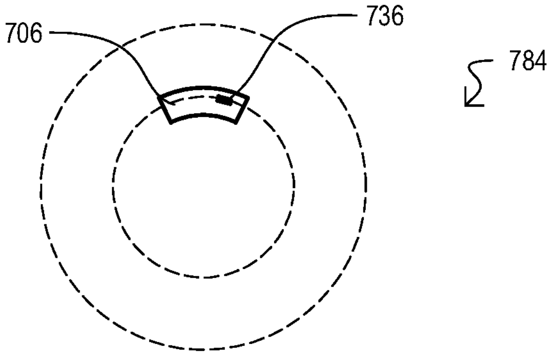
FIG. 7 is a diagram of a tire firmness control device according to an embodiment.

FIG. 7 is a diagram showing a tire firmness control device 706 according to an embodiment. A tire firmness control device 706 can alter a firmness of a tire in response to target TF values. In the embodiment shown, tire firmness control device 706 can include a tire device 736, which can take the form of that shown in FIG. 6A or 6B, or an equivalent. In operation, tire device 736 can wirelessly receive target TFs values, and provide them to tire firmness control device 706. In response, tire firmness control device 706 can adjust a tire firmness to meet the target TF.

In this way, a tire firmness device can receive dynamically changing tire firmness values, received from, or calculated by a corresponding tire device.

Figure 8:
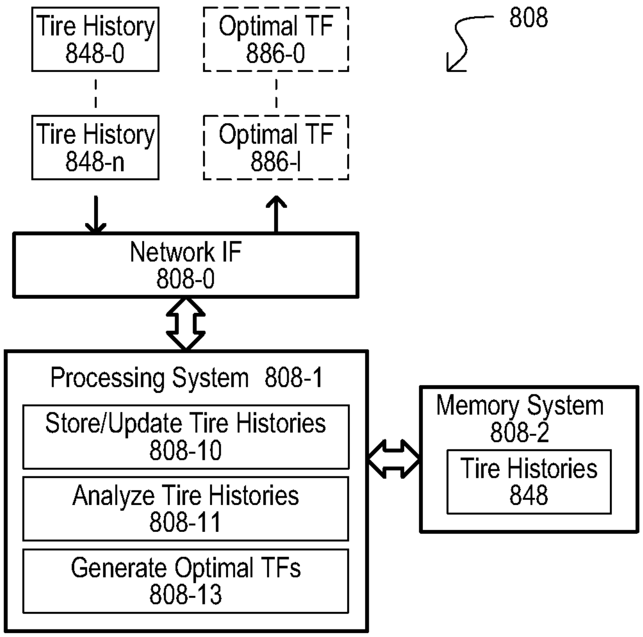
FIG. 8 is a block diagram of a remote computing system according to an embodiment.

FIG. 8 is a block diagram of a remote computing system 808 according to an embodiment. A remote computing system 808 can include a network IF 808-0, a processing system 808-1, and a memory system 808-2. A network interface 808-0 can receive tire histories 848-0 to **848-*n* from various vehicles over a wireless network. Optionally, a network interface can transmit optimal tire firmness values 886-0 to 886-1**.

A processing system 808-1 can execute various operations, including but not limited to, storing/updating tire histories 808-10, analyzing tire histories 808-11, and generating optimal target TFs 808-13. Storing and updating tire histories 808-10 can include processing received wireless messages to extract tire firmness values and corresponding modes and/or conditions. Analyzing tire histories 808-11 can include processing tire history data, to determine tire performance at various tire firmness values, as well as corresponding modes and/or conditions. Generating an optimal TFs 808-13 can include determining which TFs provided the best performance for a given mode and/or conditions.

A memory system 808-2 can provide memory of any suitable type to a processing system 808-1. A memory system 808-2 can store tire histories 848 and any other suitable data.

In this way, a remote computing system can include a processing system that analyzes tire histories to arrive at optimal target tire firmness values for a vehicle operating mode and/or conditions.

Figure 9A:
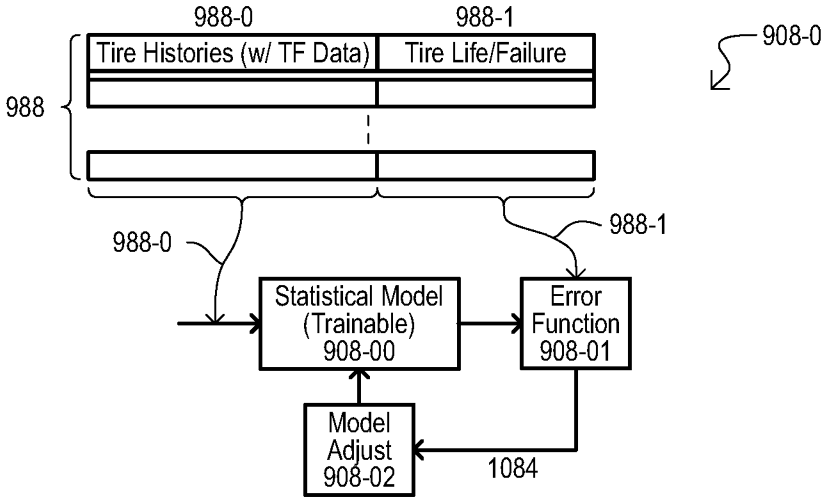
FIGS. 9A and 9B are diagrams showing tire history processing systems according to embodiments.
Figure 9B:
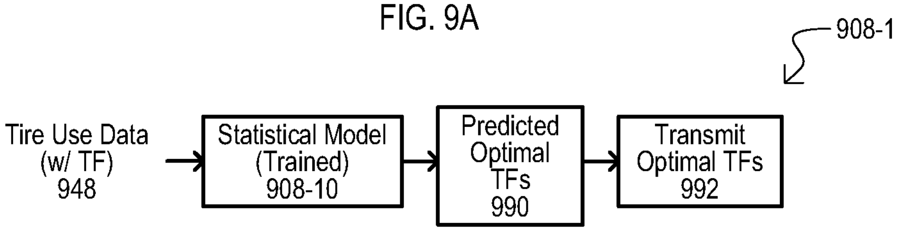

FIGS. 9A and 9B are diagrams of a machine learning system 908-0/908-1 that can generate optimal tire firmness values according to an embodiment. FIG. 9A shows a system 908-0 that can include a trainable statistical model 908-00, error function 908-01, model adjust 908-02, and training data 988, which can be stored in a memory system, like that shown as 808-2 in FIG. 8. A trainable statistical model 908-00 can include any suitable model including an artificial neural network. An error function 908-01 can determine an error between training data input and training output. A model adjust 908-02 can adjust model 908-00 in response to error data 984. A model adjust 908-02 can include any suitable machine learning operation (e.g., back propagation of neuron weights). Training data 988 can include tire histories 988-0 and corresponding tire life and/or failure events 988-1. Tire histories 988-0 can include tire firmness values, as well as any other corresponding data as those described herein, or equivalents. Life/failure events 988-1 can correspond to tire histories. In some embodiments, training data 988 can be data for a same type or class of tire. In some embodiments, such training data can be logged or acquired at a final disposition point for a tire.

FIG. 9B is a diagram of a trained system 908-1 according to an embodiment. A system 908-1 can be implemented with suitable computing system, including but not limited to a vehicle system and/or a remote computing system. A system 908-1 can include a trained statistical model 908-10, which can be a model like that shown in FIG. 9A, after the model has been trained with the training data. In response to new tire history data 948, a trained model 908-10 can generate (e.g., infer) predicted optimal TFs values 990 for tires corresponding to the new tire history data 948. Such predicated optimal TF values 990 can be transmitted 992 to a vehicle with the tires corresponding to the new history data 948, or a vehicle system with a similar tire history.

In this way, machine learning can be used to generate optimal tire firmness values based on a tires use, as tire profile data.

Figure 10A:
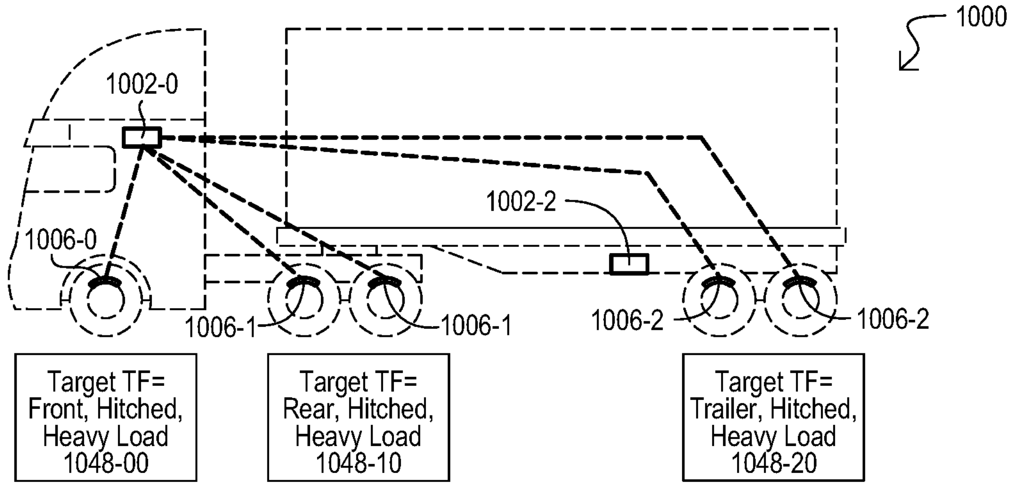
FIGS. 10A to 10C are diagrams showing systems and operations according to embodiments.
Figure 10B:
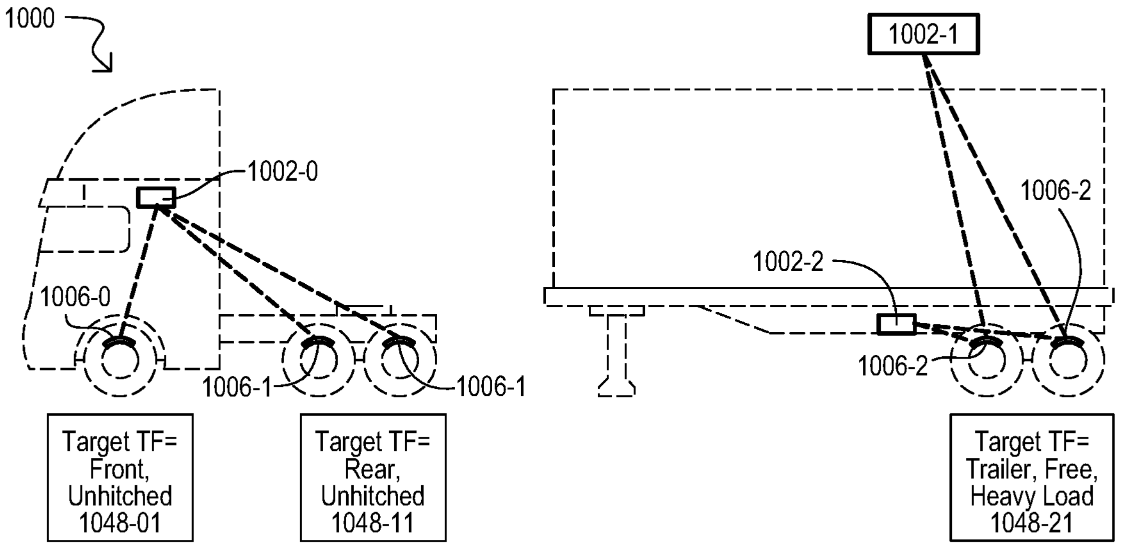
Figure 10C:
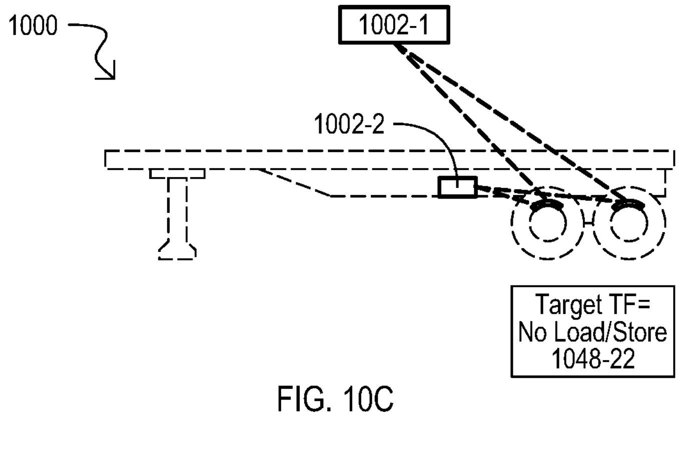

FIGS. 10A to 10C are diagrams showing a system 1000 and operations according to a further embodiment. A system 1000 can include a vehicle system 1002-0 with tire firmness control devices for various tires, including front tire devices 1006-0, rear tire devices 1006-1, and trailer tire devices

1006-2. Optionally, a system can include a facility system 1002-1 (not shown in FIG. 10A) or trailer system 1002-2.

FIG. 10A shows a system 1000 in a towing mode. In response to any of user mode data, configuration data and/or sensor data, vehicle system 1002-0 can set target TFs for the towing mode. Such an action can include transmitting target TFs 1048-00 to front tire devices 1006-0 and target TFs 1048-10 to rear tire devices 1006-1. A vehicle system 1002-0 or a trailer system 1002-3 can transmit target TFs 1048-20 to trailer tire devices 1006-2. Such target TFs (1048-00, -10, -20) can be values determined to be optimal for a driving mode in a towing configuration (e.g., highway driving, city driving, economy etc.). In the embodiment shown, target TFs can vary according to a size of a towed load.

FIG. 10B shows a system 1000 in an unhitched mode. An unhitched mode can be a mode entered by a driver, detected by sensors of the towing vehicle, sensors of a trailer, sensors of a load, or combinations thereof. A vehicle system 1002-0 can transmit target TFs 1048-01, 1048-11 to front and rear tire devices 1006-0, 1006-1, respectively. Such target TFs (1048-00, -10, -20) can be values determined to be optimal for a driving mode in an unhitched (e.g., non-towing) configuration. A vehicle system 1002-0, facility system 1002-1 or trailer system 1002-2 can transmit target TFs 1048-21 to trailer devices 1006-2. Such values can be determined to be optimal for a driving mode for a trailer (e.g., stationary, with a load).

FIG. 10C shows a system 1000 with a trailer in a storage mode. A towed device (not shown) can have target TF values as described for FIG. 10B (optimized for its current mode). A facility system 1002-1 or trailer system 1002-2 can transmit target TFs 1048-22 to trailer devices 1006-2. Such target TFs 1048-22 can be optimized for tire life when a trailer is stored.

In this way, one or more systems can dynamically change target tire firmness values for different configurations, including multiple vehicle systems, such as towed tractor trailer systems.

While embodiments can include the various methods described in conjunction with systems and devices described herein, additional methods will now be described with reference to flow diagrams.

Figure 11:
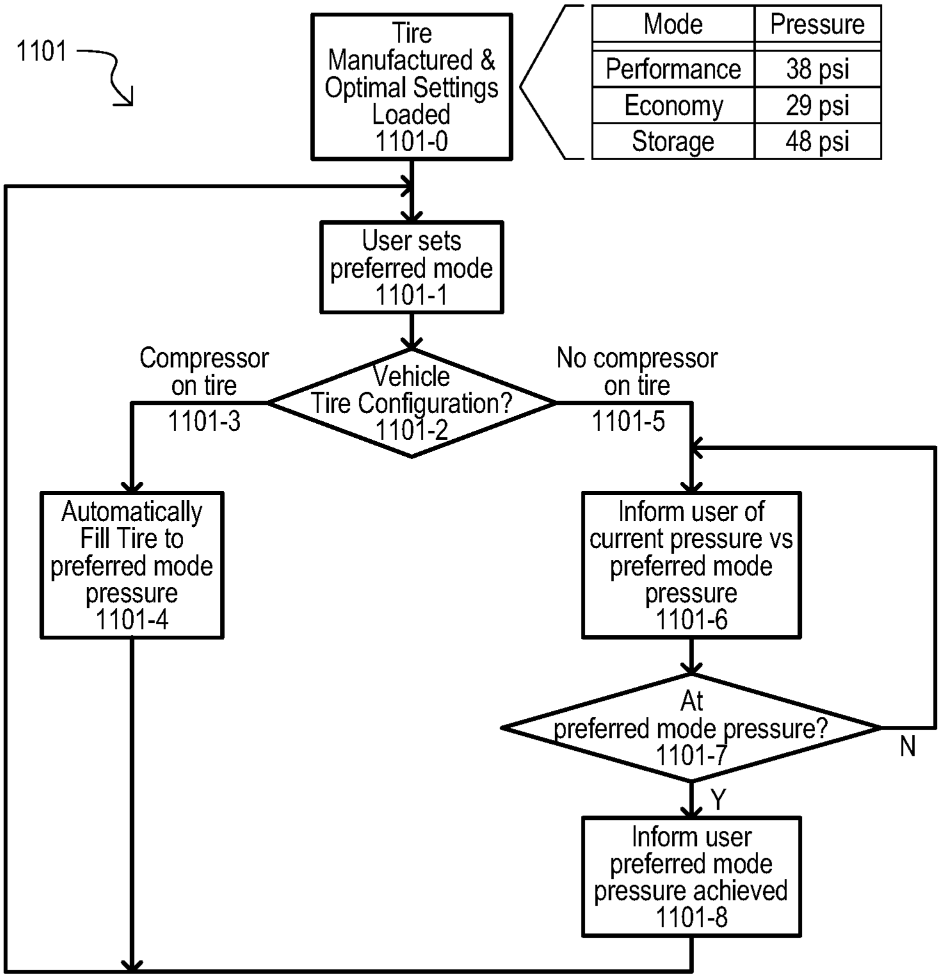
FIG. 11 is a flow diagram of a method according to an embodiment.

FIG. 11 is a flow diagram of a method 1101 according to an embodiment. A method 1101 can include a tire being received that has been loaded with optimal settings 1101-0. In some embodiments, a storage device can be included in a manufactured tire that can wirelessly transmit tire firmness values to a vehicle system. Such transmission can be active (e.g., storage device has BT circuits), or such transmission can be passive (e.g., RFID). In some embodiments, optimal mode settings can include mode identification and corresponding tire firmness values. FIG. 11 shows three modes (Performance, Economy, Storage) and corresponding tire pressure values. However, such values are provided by way of example, and should not be construed as limiting.

A method 1101 can include a user setting a preferred mode 1101-1. Such an action can include a user providing user mode data as described for embodiments herein, or equivalents. A vehicle tire configuration can be determined 1101-2. Such an action can include determining if a vehicle has an automatic tire firmness control device (e.g., compressor on tire). If a vehicle has an automatic tire firmness device (1101-3), a method can include automatically set a tire to a firmness corresponding to the selected mode 1101-4. In some embodiments, such an action can include automatically filling a tire to a pressure corresponding to the selected mode.

If a vehicle does not have an automatic tire pressure device (1101-5), a method can include a user being informed of a current tire firmness with respect to a firmness for the preferred mode 1101-6. Such an action can include any suitable method of conveying information to a user, including but not limited to communicating through a user interface of a vehicle and/or a user device. A method 1101 can then determine if a tire is at the tire firmness corresponding to a user mode 1101-7. If a tire is not at a mode firmness (N from 1101-7), a method can continue to inform a user of a current firmness versus a mode firmness. If a tire is at a mode firmness (Y from 1101-7), a method can inform a user that the mode tire firmness has been achieved 1101-8.

A method 1101 can then return to determining if a user has selected a mode 1101-1.

In this way, a method can include a user determining a mode for a vehicle, and then automatically setting a tire to a mode firmness, or informing a user of a mode firmness.

Figure 12:
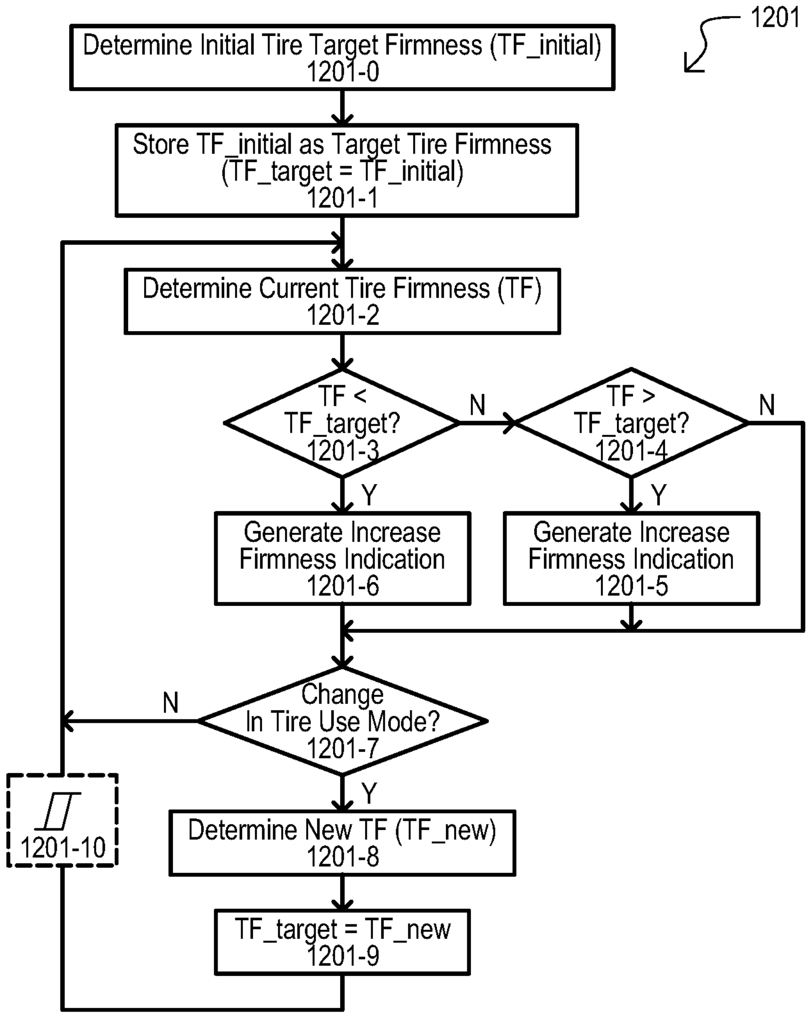
FIG. 12 is a flow diagram of a method according to another embodiment.

FIG. 12 is a flow diagram of a method 1201 according to another embodiment. A method 1201 can include determining an initial TF 1201-0. Such an action can include accessing tire information and selecting a firmness according to one of the modes (e.g., a default mode). An initial tire firmness can be set to a target TF 1201-1.

A method 1201 can determine a current TF 1201-2. Such an action can include receiving TF values from tire devices, including but not limited to BT tire devices transmitting TF values to a vehicle system. If a current TF is less than a target TF (Y from 1201-3), an increase firmness indication can be generated 1201-6. Such an action can include any of those described herein, including but not limited to, informing a user (e.g., current TF versus target TF) and/or sending a target TF to a firmness control device that can automatically increase a tire firmness. Similarly, if a current TF is greater than a target TF (Y from 1201-4), a decrease firmness indication can be generated 1201-5. As noted herein, target TFs can be single values or ranges.

A method 1201 can then monitor for a change in a tire use mode 1201-7. Such an action can include changing a mode according to any of the factors described herein, or equivalents, including but not limited to: changes based on user selection, changes based on vehicle configuration, changes based on driving environment, and/or changes based on vehicle sensors. If there is not a change in mode (N from 1201-7), a method can return to determining a current TF 1201-2.

If there is a change in mode (Y from 1201-7), a method can determine a new TF 1201-8. Such an action can include calculating a new TF according to any of those described herein or equivalents. A new TF can be set as a new target TF 1201-9. A method can then return to determining a current TF 1201-2.

In some embodiments, there can be some hysteresis 1201-10 between a new target value and determining a difference between a current TF and target TF. Such hysteresis can take any suitable form according to the target TF values used and/or desired vehicle response. Accordingly, hysteresis 1201-10 can be value based (e.g., greater difference between current TFs and target TFs needed to generate new firmness indications than to maintain current TFs), can be time based (e.g., a comparison between current TFs and target TFs is made after a certain period of time), or can be a combination thereof.

In this way, a method can establish initial (e.g., default) tire firmness values for a vehicle, and then update such tire firmness values as a vehicle switches between different modes.

Embodiments can include methods, devices and systems that wirelessly receive and store tire information in memory circuits. By operation of processing circuits, an initial tire firmness value can be determined for at least one tire using at least the stored tire information. By operation of communication circuits, an initial tire firmness value can be wirelessly transmitted. Mode information can be received and stored in memory circuits. In response to the mode information, by operation of processing circuits, a revised tire firmness value can be determined for the at least one tire using at least the mode information. By operation of communication circuits, revised tire firmness values can be wirelessly transmitted.

Embodiments can include methods, devices and systems having first wireless circuits compatible with at least a first wireless standard and configured to receive tire information, transmit an initial tire firmness value, and transmit a revised tire firmness value. Processing circuits can be configured to determine the initial tire firmness value using at least the tire information, and determine the revised tire firmness value using at least the tire information and mode information. Memory circuits can be configured to store at least the tire information.

Embodiments can include methods, devices and systems having first wireless circuits compatible with at least a first standard and configured to receive tire information, transmit an initial tire firmness value, and transmit a revised tire firmness value. Processing circuits can be configured to determine the initial tire firmness value using at least the tire information, and determine the revised tire firmness value using at least the tire information and mode information. Memory circuits can be configured to store at least the tire information. An antenna system can be coupled to the first wireless circuits.

Methods, devices, and systems according to embodiments can include wirelessly receiving tire information via wireless communications compatible with at least one Bluetooth standard.

Methods, devices, and systems according to embodiments can include receiving user data at an interface that indicates one driving mode from a plurality of different driving modes.

Methods, devices, and systems according to embodiments can include receiving vehicle state information as mode information.

Methods, devices, and systems according to embodiments can include receiving mode information by operation of second wireless circuits.

Methods, devices, and systems according to embodiments can include, in response to a revised tire firmness value, increasing a firmness of the at least one tire if the current firmness of the tire is less than the revised tire firmness value.

Methods, devices, and systems according to embodiments can include, generating tire history data that includes at least tire firmness values for the at least one tire, including changes in tire firmness for the at least one tire. Tire history data can be stored in nonvolatile memory.

Methods, devices, and systems according to embodiments can include wirelessly transmitting tire history data.

Methods, devices, and systems according to embodiments can include interface circuits configured to receive a user selected driving mode from a plurality of driving modes. Mode information can include the user selected driving mode.

Methods, devices, and systems according to embodiments can include processing circuits configured to receive vehicle state data. Mode information can be associated with the vehicle state data.

Methods, devices, and systems according to embodiments can include at least one tire firmness control device configured to at least increase the firmness of the at least one tire in response to the initial tire firmness value and revised tire firmness value.

Methods, devices, and systems according to embodiments can include second wireless circuits compatible with at least a second wireless standard.

Methods, devices, and systems according to embodiments can include second wireless circuits are configured to transmit tire history data. Processing circuits can be configured to acquire the tire history data of the at least one tire over time. The tire history data can include tire state data, including tire firmness values.

Methods, devices, and systems according to embodiments can include a remote computing system configured to receive the tire history data, and process at least the tire history data to generate optimal tire firmness values for different vehicle modes.

Methods, devices, and systems according to embodiments can include second wireless circuits configured to receive remote mode data. Mode information can include remote mode data.

Methods, devices, and systems according to embodiments can include a user interface configured to receive at least the revised tire firmness value, and provide at least the revised tire firmness value to a user.

It should be appreciated that reference throughout this specification to "one embodiment" or "an embodiment" means that a particular feature, structure, or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

by operation of a tire apparatus included with a tire, transmitting tire information;

by operation of first wireless circuits of a tire device of a vehicle, wirelessly receiving and storing tire information in memory circuits, the tire information including manufacturer data and a plurality of target firmness values, each corresponding to a different mode of operation for the vehicle;

by operation of processing circuits of the tire device, determining an initial tire firmness value for at least one tire using at least the stored tire information;

by operation of communication circuits of the tire device, wirelessly transmitting the initial tire firmness value;

by operation of the first wireless circuits, wirelessly receiving state information from at least one sensor of the vehicle;

by operation of the processing circuits, determining a revised tire firmness value for the at least one tire using at least the tire information and the state information; and by operation of first wireless circuits, wirelessly transmitting the revised tire firmness value.

2. The method of claim 1, wherein wirelessly transmitting the initial and revised tire firmness values includes transmitting data according to at least one Bluetooth standard.

3. The method of claim 1, further including in response to the revised tire firmness value, increasing a firmness of the at least one tire if the current firmness of the tire is less than the revised tire firmness value.

4. The method of claim 1, further including:

by operation of the processing circuits, generating tire history data comprising at least tire firmness values for the at least one tire, including changes in tire firmness for the at least one tire; and storing the tire history data in nonvolatile memory of the tire device.

5. The method of claim 4, further including, by operation of second wireless circuits, wirelessly transmitting the tire history data.

6. A device for a tire of a vehicle, comprising:

first wireless circuits compatible with at least a first wireless standard and configured to receive tire information from a tire apparatus included with the tire, the tire information including manufacturer data and a plurality of target firmness values, each corresponding to a different mode of operation for the vehicle, transmit an initial tire firmness value, receive state information for the vehicle from at least one sensor, and transmit a revised tire firmness value;

processing circuits configured to determine the initial tire firmness value using at least the tire information, and determine the revised tire firmness value using at least the tire information and the state information; and memory circuits configured to store at least the tire information and the state information.

7. The device of claim 6, wherein the first wireless circuits are compatible with at least one Bluetooth standard.

8. The device of claim 6, further including:

interface circuits configured to receive a user selected driving mode from a plurality of driving modes; and determining the revised tire firmness value includes using the user selected driving mode.

9. A system for use with a tire, comprising:

first wireless circuits compatible with at least a first standard and configured to receive tire information from a tire apparatus included with the tire, the tire information including manufacturer data and a plurality of target firmness values, each corresponding to a different mode of operation for the vehicle, transmit an initial tire firmness value, receive state information for the vehicle from at least one sensor, and transmit a revised tire firmness value, processing circuits configured to determine the initial tire firmness value using at least the tire information, and determine the revised tire firmness value using at least the tire information and the state information; and memory circuits configured to store at least the tire information and the state information; and an antenna system coupled to the first wireless circuits.

10. The system of claim 9 wherein the first standard is a Bluetooth standard.

11. The system of claim 9, further including at least one tire firmness control device configured to at least increase the firmness of the at least one tire in response to the initial tire firmness value and revised tire firmness value.

12. The system of claim 9, further including second wireless circuits compatible with at least a second wireless standard.

13. The system of claim 12, wherein:

the second wireless circuits are configured to transmit tire history data; and the processing circuits are configured to acquire the tire history data of the at least one tire over time, the tire history data comprising tire state data, including tire firmness values.

14. The system of claim 13, further including:

a remote computing system configured to receive the tire history data, and process at least the tire history data to generate optimal tire firmness values for different vehicle modes.

15. The system of claim 12, wherein:

the second wireless circuits are configured to receive remote mode data; and determining the revised tire firmness value includes using the remote mode data.

16. The system of claim 9, further including:

a user interface configured to receive at least the revised tire firmness value, and provide at least the revised tire firmness value to a user.

* * * * *